Jan. 10, 1967 G. F. LYMAN 3,297,154

REEL CLOSURE

Filed April 23, 1965

INVENTOR
GEORGE F. LYMAN

BY,
Wolf, Greenfield + Hieken

ATTORNEYS

United States Patent Office 3,297,154

Patented Jan. 10, 1967

3,297,154

REEL CLOSURE

George F. Lyman, South Hadley, Mass., assignor to The Morningstar Corporation, Cambridge, Mass., a corporation of Massachusetts Filed Apr. 23, 1965, Ser. No. 450,276
8 Claims. (Cl. 206—52)

This invention relates to the storage of film and tape reels and more particularly comprises a closure for the periphery of a reel.

Conventionally, tape and film reels are stored in containers which completely enclose the reels. Ordinarily the containers comprise a base, cover and some form of latch for locking the base and cover closed. Even the most streamlined of that form of case is approximately twice the thickness of the reel for which it is designed, and consequently such cases effectively halve the storage capacity of bins or shelves upon which the reels are stored.

Most of the containers now in use are molded of plastic material. Because of their size, the plastic materials used must be relatively inexpensive such as polystyrene and polypropylene, although they do not provide maximum protection for the reel. Nevertheless, these containers are relatively expensive. Because of the amount of material involved in their manufacture, the use of better qualities of plastic material such as polycarbonates and polyamides having greater strength and heat resistance and longer life is economically prohibitive.

Recently considerable attention has been directed to the development of other forms of reel containers so as to reduce their storage size, cost and other limitations. Many of these designs have taken the form of a band which encircles the periphery of the reel and engages the flange edges so as to form a closure about the reel periphery. When used on a reel having flanges free of any openings, the band cooperates with the reel to define a completely closed container for the tape or film wound on the reel. While such bands may perform their primary function of providing an enclosure for protecting the materials stored on the reels, such bands which are now available for the most part are difficult to mount on the reels. In order to mount the bands on the reel flanges it is usually necessary to very carefully thread the edges of the flanges into the channels provided on the bands, and thereafter the latching devices provided on the ends of the bands must be joined with care to avoid dislodging the flange edges from the channels. These manipulations require more time than can be reasonably given for such an operation, and particularly are more inconvenient than the relatively simple manipulations required to deposit a reel in the more conventional forms of containers. As a result, such bands have not met with general approval.

The latching devices themselves are often awkward to use particularly because of their location at the periphery of the reel. The conventional reel cases described above ordinarily provide a locking or latching device at the center of the cover aligned with the hub of the reel, and the operators are not accustomed to operate latching devices at the periphery.

The band-type or wrap-around closure exposes the reel hub and affords it no protection, while the conventional type of reel case completely encloses the reel and protects the reel hub as much as the other portions of the reel. Protection for the reel hub is important particularly when the hub is a finely machined product made of aluminum or other similar material. The aluminum hub reels which are now being adopted in the computer industry because of their finely machined surfaces, are particularly easy to mar, and any gouges or scratches on the surface create burs which destroy the benefits derived at substantial cost from the aluminum hubs with the machined hub faces.

One important object of this invention is to provide a wrap-around type of reel closure which is exceedingly simple to mount on and close about the periphery of a reel.

Another important object of this invention is to provide a reel closure which consumes a minimum of space in storage, uses a comparatively small quantity of material in its manufacture and is capable of forming a more satisfactory seal about the reel periphery so as to provide as much protection for the tape or film stored on the reel as the more conventional forms of containers.

Yet another important object of this invention is to provide a wrap-around type of reel closure that has a latching device which is operated at the center of the reel as in conventional forms of reel containers.

To accomplish these and other objects, the closure of this invention includes among its important features a plurality of arcuate wall sections of the same radius which when assembled end to end define a cylindrical wall. A channel is formed on the inner side of the cylindrical wall for receiving the periphery of a reel. Means including a handle assembly is secured to each of the wall sections which handle assembly is disposed within the hub of a reel stored within the cylindrical wall. When the handle is turned in one direction each of the wall sections moves radially so as to enable a reel to be placed within the wall, and when the handle is turned in another direction it pulls the wall sections together so that they lie end to end and capture the periphery of the reel in the channel.

These and other objects and features of this invention along with its incident advantages will be better understood and appreciated from the following detailed description of one embodiment thereof, selected for purposes of illustration and shown in the accompanying drawing, in which.

Figure 1:
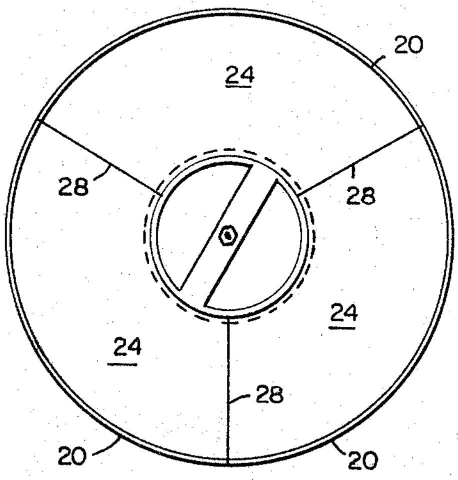
FIG. 1 is a plan view of a reel closure constructed in accordance with this invention and shown in its closed condition.

The reel closure shown in the drawings is composed of a plurality of sector-shaped members 10, a retainer plate 12, a guide disc 14, a handle member 16 and a screw and nut 18. These several parts are described in detail below.

Figure 2:
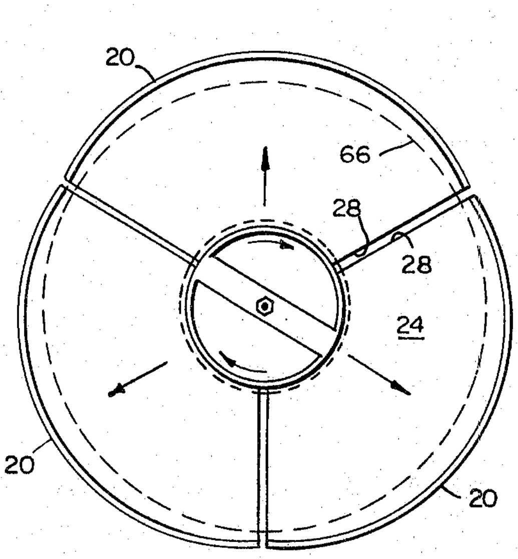
FIG. 2 is a view similar to that of FIG. 1 but showing the closure in the open condition.
Figure 3:
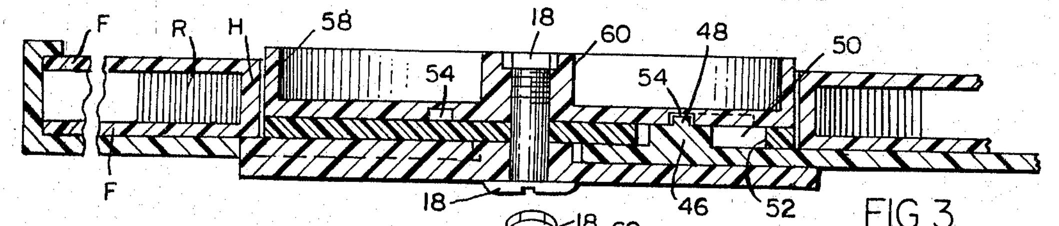
FIG. 3 is an enlarged fragmentary cross-sectional view of the central portion of the closure shown in FIGS. 1 and 2.

The embodiment of the invention shown includes three sector-shaped members 10 which together define the base of the case. It is to be understood that a different number of members may be employed. Each of the members 10 includes an arcuate wall 20 at its periphery, and the arcuate walls 20 of the three sector-shaped members together define a cylindrical wall that surrounds the periphery of a reel contained in the closure. Each arcuate wall 20 is provided with a lip 22 generally parallel to the bottom plate 24 of the member 10, and the plate and lip together define a channel 26 on the inner surface of the wall 20 which channel receives the periphery of a reel disposed within the closure. This is shown in the left side of FIG. 2 wherein the reel R is disposed in the closure and the periphery of the reel flanges F lie within the channel 26.

When the closure is in a closed condition as shown in FIG. 1, the side edges 28 of each sector-shaped member 10 engage the side edges of the adjacent members tc define a solid annular disc from the plates 24 about the handle member 16. In the closed condition, the diameter of the closure measured from the inner surface of the channel 26 just exceeds the diameter of the reel R to be packaged in the closure so that the lip 22 overlies the outer surface of the periphery of the upper reel flange. Because the arcuate wall segments 20 are disposed in end to end relationship when the reel is closed, the channel 26 defines a continuous cover about the periphery of the reel so that the material wound upon the reel is completely protected. It may be desirable to use in the channel a flat compressible band (not shown) to enhance the seal about the periphery of the reel.

Figure 4:
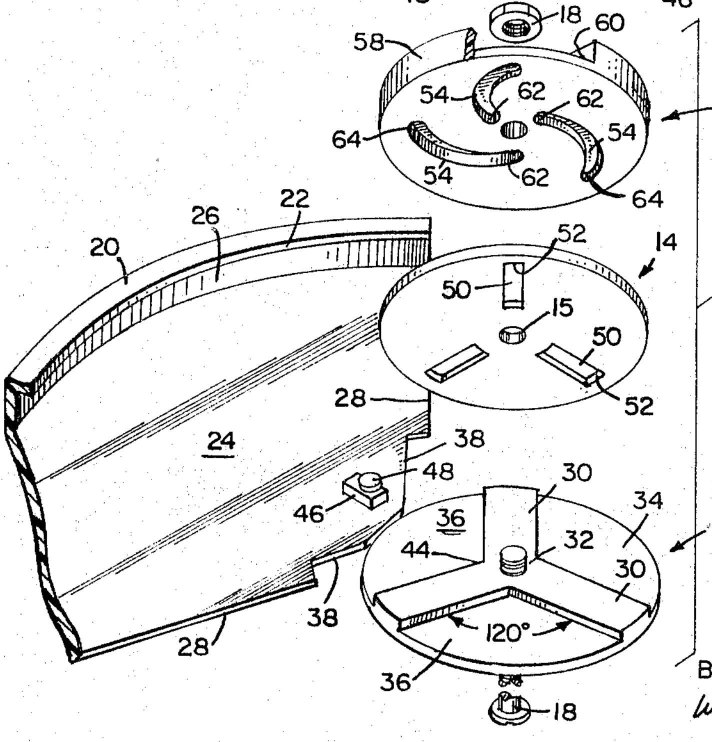
FIG. 4 is an exploded fragmentary view of the latching device of the closure.

The retainer plate 12 is shown to be of circular configuration and carries three ribs 30 which radiate from the center 32, and the ribs 30 are disposed 120° apart. The diameter of the disc 12 is somewhat greater than the inner diameter of the hub o fthe reel to be packaged in the closure as is evident in FIG. 2. Between the adjacent ribs 30 the base 34 of the retainer plate 12 provides recessed support surfaces 36, each of which receives the inner radial portion of one sector-shaped member 10. In FIG. 4 it will be noted that the side edges 28 of the sector-shaped member shown are notched at their radially inner ends as shown at 38, and the notches 38 of adjacent sector-shaped members provide room for the ribs 30. Thus, when the sector-shaped member 10 is positioned with its inner corner portion 40 disposed on the support surface 36, the notches 38 are aligned with the sides of the ribs 30, and when the member 10 is in its radially inner position its inner blunt edge 42 lies closely adjacent the corner 44 formed by the two adjacent ribs 30, and the notches 38 abut against the sides of the ribs. The depth of each notch 38 is equal to one half the width of rib 30 so that the unnotched portions of the side edges 28 of the members 10 abut against one another beyond the ribs 30 when the members are in their inner radial positions.

In FIG. 4 it will be noted that a slide 46 is provided at the inner corner 40 of the plate 24 of the sector-shaped member 10, and the slide carries a pin 48 on its upper surface, which forms part of the actuating mechanism to move the members 10 in and out in a radial direction.

The thickness of the plate 24 of the sector-shaped member 10 is preferably slightly less than the height of the ribs 30 so that the upper surfaces of the ribs 30 lie just above the surface of the plate 34. The slide 46 extends upwardly above the surface of the ribs 30. The advantage of this arrangement is explained below.

The disc 14 is secured in place on the upper surfaces of the ribs 30, and the three radially oriented tracks 50 are disposed 120° apart in position to receive the slides 46 carried on the upper surfaces of the plates 24. The tracks 50 in the disc 14 restrict the movement of the sector-shaped members to a radial direction because of the orientation of the tracks. The tracks 50 are of a greater radial extent than the slides 46 and therefore allow the slides 46 to move a limited extent in a radial direction. When the disc 14 is positioned over the retainer plate 12 and overlies the inner corners 40 of the plates 24, and with the slides 46 disposed in the tracks 50, the pins 48 extend upwardly above the upper surface of the disc 14. The pins 48 serve as cam followers and lie within the arcuate cam tracks 54 formed on the lower surface of the bottom disc 56 of the handle member 16.

Each of the cam tracks 54 defines an arcuate path which moves radially over a circumferential distance of approximately 90°. The bottom disc 56 of the handle member is substantially the same diameter as the disc 14, and both are just slightly smaller than the inner diameter of the hub of the reel R. Therefore, when the reel is placed within the closure the disc 14 and handle member 16 lie within the hub of the reel.

The bottom disc 56 of the handle member 16 supports an annular wall 58 and together they form a dish-shaped handle member which contains a gripping bar 60 that extends across the diameter of the dish. The annular wall 58 is designed to extend upwardly just within the inner surface of the reel hub so as to afford that surface protection from marring or other abuse.

The entire assembly including the sector-shaped members 10, the retainer plate 12, disc 14 and handle member 16 are secured together by the screw 18 which passes through the holes 13, 15 and 17 provided in the centers of the plate 12, disc 14 and handle member 16, respectively. The sector-shaped members 10 are retained in the assembled position by the slides 46 disposed in the tracks 50 of the disc 14.

From the foregoing it will be appreciated that when the handle member 16 is turned to one extreme position wherein the cam followers 48 lie at the innermost ends 62 of the cam tracks 54, each of the members 10 will be disposed in the innermost radial position with the side edges 28 of the members abutting one another and with the side walls 20 in end to end relationship.

When the handle member 16 is turned through approximately 90°, the cam tracks 54 force the pins or cam followers 58 radially outward, and the slides 46 move radially in the tracks 50. This movement continues until the pins 48 engage the outer radial extremity 64 of the several cam tracks 54 and the slides 46 lie adjacent the outer ends 52 of the tracks 50. When the handle is turned in this manner, the sector-shaped members 10 assume the position shown in FIG. 2. It will be noted in that figure that the diameter of the case increases from that suggested by broken line 66 to the full line showing. When so opened, a reel may be dropped in the case with the hub H of the reel surrounding the annular wall 58 of the handle member 16. The hub H rests upon the outer ends of the ribs 30 particularly if the height of ribs 30 exceeds the thickness of the plates 24. The reel diameter is substantially equal to that represented by the broken line 66. When the handle member 16 is returned to the position shown in FIG. 1 by rotating it 90° counterclockwise, the sector-shaped members move radially inward as described and the edges of the reel flanges are captured within the channel 26 on the inner surface of the arcuate wall segments 20. It will be appreciated that the annular handle wall 58 will protect the hub of the reel while the wall segments 20 form a seal about the outer surface of the reel.

Having described this invention in detail, those skilled in the art will appreciate that numerous modifications may be made of this invention without departing from its spirit. Therefore, it is not intended to limit the breadth of this invention to the single embodiment illustrated and described. Rather, it is intended that the scope of this invention be determined by the appended claims and their equivalents.

What is claimed is:

1. A reel case comprising
   - a plurality of sector-shaped members each having an upstanding rim at its outer edge with said rims together forming a continuous cylindrical wall when the members are disposed with their side edges engaging one another,
   - a retainer plate disposed on one side of the members adjacent their collective center,
   - a disc axially aligned with the plate and having a number of radial tracks therein,
   - a slide disposed on each of the members and each slide disposed in a track in the disc,
   - a cam follower mounted on each of the slides and extending through the tracks on the disc,
   - a cam plate disposed above the disc and having a plurality of arcuate cam tracks each of which defines a path that varies in distance from the axis and each of which receives one of the cam followers,
   - means maintaining the plates and disc in assembled relationship and enabling the cam plate to rotate with respect to the disc and the retainer plate, and a handle carried on the outside of the cam plate for rotating that plate to move the sector-shaped members radially as the followers move in the cam tracks.

2. A reel case comprising a plurality of sector-shaped members each having an upstanding rim at its outer edge with said rims together forming a continuous cylindrical wall when the members are disposed with their side edges engaging one another, a channel formed on the inner side of the cylindrical wall for forming a seal about the edge of a reel disposed on the members within the wall when the edges engage one another, and a handle assembly including a handle grip secured to the members and oriented to lie within the center of a reel within the case for moving the members radially in response to rotation of the handle grip to secure and free the edge of a reel disposed within the case.

3. A reel case comprising, a plurality of arcuate wall sections of the same radius which when assembled end to end define a cylindrical wall, a channel formed on the inner side of the cylindrical wall for forming a seal about the edge of a reel disposed within the wall when the sections are disposed end to end, and means including a handle assembly secured to the sections for moving each radially between a first position wherein the sections are disposed end to end and are capable of sealing the edge of a reel and a second position wherein the diameter of the cylindrical wall is effectively enlarged to allow a reel to be placed within and be withdrawn from the cylindrical wall.

4. A reel case as defined in claim 3 further characterized by said handle assembly having a grip oriented to extend through the center of a reel placed within the cylindrical wall.

5. A reel closure comprising, a round tray-like member having a bottom wall and a cylindrical side wall for receiving a reel, said member being divided into a plurality of parts which may move relative to one another for changing the diameter of the side wall, a channel provided on the inner face of the side wall for securing the periphery of a reel placed on the bottom wall when the diameter of the side wall is minimized, and a handle located in the center of the tray-like member and secured to its parts for increasing and decreasing the side wall diameter.

6. A reel case as defined in claim 1 further characterized by a plurality of ribs carried by the retainer plate and extending upwardly between the edges of the members for supporting a reel placed within the case.

7. A reel closure as defined in claim 5 further characterized by said handle including a cylindrical wall extending upwardly from the bottom wall of the member for covering the inner surface of a hub of a reel placed on the bottom wall.

8. A reel case as defined in claim 6 further characterized by a cylindrical wall carried by the cam plate for covering the inner surface of a hub of a reel placed on the sector-shaped members.

References Cited by the Examiner

UNITED STATES PATENTS

| | | | |
|---|---|---|---|
| 2,563,198 | 8/1951 | Thalhammer | 242—71.8 |
| 3,233,728 | 2/1966 | Johnson et al. | 206—52 |

FRANK J. COHEN, *Primary Examiner.*

L. D. CHRISTIAN, *Assistant Examiner.*